US012679967B2

(12) United States Patent
Choi et al.

(10) Patent No.: US 12,679,967 B2
(45) Date of Patent: Jul. 14, 2026

(54) THERMOPLASTIC RESIN COMPOSITION

(71) Applicant: LG CHEM, LTD., Seoul (KR)

(72) Inventors: Jeong Su Choi, Daejeon (KR); Won Seok Lee, Daejeon (KR); Roo Da Lee, Daejeon (KR); Sang Hoo Park, Daejeon (KR); Jong Ju Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 616 days.

(21) Appl. No.: 18/034,253

(22) PCT Filed: Jul. 19, 2022

(86) PCT No.: PCT/KR2022/010528
§ 371 (c)(1),
(2) Date: Apr. 27, 2023

(87) PCT Pub. No.: WO2023/008807
PCT Pub. Date: Feb. 2, 2023

(65) Prior Publication Data
US 2023/0399503 A1    Dec. 14, 2023

(30) Foreign Application Priority Data

Jul. 26, 2021    (KR) ........................ 10-2021-0098177
Jul. 18, 2022    (KR) ........................ 10-2022-0088170

(51) Int. Cl.
| | |
|---|---|
| C08L 51/04 | (2006.01) |
| C08F 212/08 | (2006.01) |
| C08F 220/14 | (2006.01) |
| C08F 220/44 | (2006.01) |
| C08L 9/06 | (2006.01) |

(52) U.S. Cl.
CPC ............ C08L 51/04 (2013.01); C08F 212/08 (2013.01); C08F 220/14 (2013.01); C08F 220/44 (2013.01); C08L 9/06 (2013.01); C08L 2207/53 (2013.01)

(58) Field of Classification Search
CPC ........ C08F 120/14; C08F 2/26; C08F 212/08; C08F 220/14; C08F 220/44; C08F 236/06; C08F 236/10; C08F 279/02; C08F 4/34; C08L 2207/53; C08L 33/12; C08L 51/04; C08L 9/06
See application file for complete search history.

(56) References Cited

U.S. PATENT DOCUMENTS

| | | | |
|---|---|---|---|
| 2004/0249073 | A1 | 12/2004 | Takahashi et al. |
| 2007/0078221 | A1 | 4/2007 | Choi et al. |
| 2017/0088704 | A1 | 3/2017 | Park |
| 2017/0260384 | A1 | 9/2017 | Choi et al. |
| 2021/0355313 | A1 | 11/2021 | Lee et al. |

FOREIGN PATENT DOCUMENTS

| | | | |
|---|---|---|---|
| CN | 1564833 | A | 1/2005 |
| CN | 106947200 | A | 7/2017 |
| JP | H07-025975 | B2 | 3/1995 |
| JP | 2012-251015 | A | 12/2012 |
| JP | 2014-181315 | A | 9/2014 |
| JP | 2015-096573 | A | 5/2015 |
| JP | 2015-096574 | A | 5/2015 |
| JP | 6288821 | B2 | 3/2018 |
| KR | 10-0165577 | B1 | 3/1999 |
| KR | 10-0364232 | B1 | 2/2003 |
| KR | 10-2007-0027991 | A | 3/2007 |
| KR | 10-0779159 | B1 | 11/2007 |
| KR | 10-0790425 | B1 | 1/2008 |
| KR | 10-2013-0046162 | A | 5/2013 |
| KR | 10-2016-0054784 | A | 5/2016 |
| KR | 10-1902060 | B1 | 9/2018 |
| KR | 10-2020-0143261 | A | 12/2020 |

OTHER PUBLICATIONS

International Search Report (with partial translation) and Written Opinion dated Oct. 24, 2022, for corresponding International Patent Application No. PCT/KR2022/010528.
1 Extended European search report issued on May 14, 2024 in corresponding European Patent Application No. 22849783.
Office Action dated Apr. 19, 2025 issued in the corresponding Chinese patent application 202280007170.5.

*Primary Examiner* — Ana L. Woodward
(74) *Attorney, Agent, or Firm* — Morgan, Lewis & Bockius LLP

(57)    ABSTRACT

The present disclosure relates to a thermoplastic resin composition which includes: a graft polymer including a rubber polymer having a gel content of 0 to 10 wt % and including an aromatic vinyl-based monomer unit and a diene-based monomer unit; and a shell including a (meth)acrylate-based monomer unit and an aromatic vinyl-based monomer unit which are grafted to the rubber polymer; and a non-grafted polymer including 90 wt % or more of a (meth)acrylate-based monomer unit.

9 Claims, No Drawings

THERMOPLASTIC RESIN COMPOSITION

CROSS-REFERENCE TO RELATED APPLICATION

This application claims priority to and the benefit of Korean Patent Application No. 10-2021-0098177, filed on Jul. 26, 2021, and Korean Patent Application No. 10-2022-0088170, filed on Jul. 18, 2022, the disclosures of which are incorporated herein by reference in their entireties.

TECHNICAL FIELD

Technical Field

The present invention relates to a thermoplastic resin composition, and specifically, to a thermoplastic resin composition that can realize excellent impact resistance, scratch resistance, matte characteristics, and processability.

Background Art

Diene-based rubber polymers are widely used as impact modifiers for various thermoplastic polymers such as graft polymers and the like due to having excellent rubber characteristics. Graft polymers can be widely used as materials for electrical products, electronic products, automobile parts, general office supplies, and the like, and can be prepared by graft polymerization of an aromatic vinyl-based monomer and a vinyl cyanide-based monomer to a diene-based rubber polymer.

Meanwhile, since the gel content of a diene-based rubber polymer affects the impact resistance of a graft polymer, an excessive amount of a molecular weight controlling agent needs to be used to adjust the gel content. However, when an excessive amount of a molecular weight controlling agent is used, a polymerization time is increased due to lowering of a polymerization rate, and thus manufacturing efficiency is degraded.

In addition, as industry has been advanced and life has been diversified in recent years, injection in a complex structure while imparting high functionality such as matte characteristics is required, but it is difficult for graft polymers using diene-based rubber polymers to realize both excellent matte characteristics and processability. Also, the embossing treatment of a mold has been proposed to realize matte characteristics, but there is a limitation in that matte characteristics cannot be realized with a general mold. Also, the use of a matting agent has been proposed to realize matte characteristics, but there are problems such as an increase in manufacturing costs due to the matting agent, degradation of basic properties, and poor matte characteristics.

Accordingly, a method of improving matte characteristics, scratch resistance, processability, and manufacturing efficiency while improving impact resistance by adjusting a gel content has been studied.

RELATED-ART DOCUMENTS

Patent Documents (Patent Document 1) JP1995-025975B

Disclosure

Technical Problem

The present invention is directed to providing a thermoplastic resin composition that can realize excellent impact resistance, scratch resistance, matte characteristics, and processability.

Technical Solution

1) One aspect of the present invention provides a thermoplastic resin composition which includes: a graft polymer including a rubber polymer having a gel content of 0 to 10 wt % and including an aromatic vinyl-based monomer unit and a diene-based monomer unit; and a shell including a (meth)acrylate-based monomer unit and an aromatic vinyl-based monomer unit, which are grafted to the rubber polymer; and a non-grafted polymer including 90 wt % or more of a (meth)acrylate-based monomer unit.

2) According to 1), the present invention provides a thermoplastic resin composition in which the rubber polymer has the gel content of 0 to 5 wt %.

3) According to 1) or 2), the present invention provides a thermoplastic resin composition in which the rubber polymer includes the aromatic vinyl-based monomer unit and the diene-based monomer unit in a weight ratio of 10:90 to 35:65.

4) According to any one of 1) to 3), the present invention provides a thermoplastic resin composition in which the rubber polymer has an average particle diameter of 20 to 100 nm.

5) According to any one of 1) to 4), the present invention provides a thermoplastic resin composition in which the graft polymer includes: 30.0 to 65.0 wt % of the rubber polymer; 10.0 to 55.0 wt % of the (meth)acrylate-based monomer unit; and 5.0 to 40.0 wt % of the aromatic vinyl-based monomer unit.

6) According to any one of 1) to 5), the present invention provides a thermoplastic resin composition in which the non-grafted polymer includes one or more selected from the group consisting of a (meth)acrylic acid-based monomer unit and an aromatic vinyl-based monomer unit.

7) According to any one of 1) to 6), the present invention provides a thermoplastic resin composition which includes: 10.0 to 50.0 wt % of the graft polymer; and 50.0 to 90.0 wt % of the non-grafted polymer.

8) According to any one of 1) to 7), the present invention provides a thermoplastic resin composition in which the shell of the graft polymer includes a vinyl cyanide-based monomer unit grafted to the rubber polymer.

9) According to any one of 1) to 8), the present invention provides a thermoplastic resin composition which includes: 5.0 to 25.0 wt % of the rubber polymer; 60.0 to 90.0 wt % of the (meth)acrylate-based monomer unit; and 3.0 to 20.0 wt % of the aromatic vinyl-based monomer unit.

Advantageous Effects

A thermoplastic resin composition according to the present invention can realize excellent impact resistance, scratch resistance, matte characteristics, and processability.

MODES OF THE INVENTION

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, a gel content is calculated as follows. A rubber polymer latex is coagulated with a diluted acid or metal salt, washed, and dried in a 60° C. vacuum oven for 24 hours to obtain a rubber mass. The rubber mass is cut with scissors to prepare a 1 g rubber section, and the rubber section is input into 100 g of toluene and stored in a 23° C. dark room for 48 hours to separate a sol and a gel. The weight of the sol and gel is substituted into the following equation to calculate a gel content. In this case, although there is no particular limitation on the type of diluted acid, one or more selected from the group consisting of hydrochloric acid, sulfuric acid, formic acid, and the like are preferred. Also, although there is no particular limitation on the type of metal salt, one or more selected from the group consisting of magnesium sulfate, calcium chloride, aluminum sulfate, and the like are preferred.

$$\text{Gel content (wt \%)} = \text{Weight of gel/Weight of rubber section} \times 100$$

In the present invention, a refractive index refers to an absolute refractive index of a material and is recognized as the ratio of the speed of electromagnetic radiation in free space to the speed of the radiation in the material, wherein the radiation may be visible light having a wavelength of 450 nm to 680 nm, specifically, visible light having a wavelength of 589.3 nm. A refractive index may be measured by a known method, i.e., by using an Abbe refractometer.

In the present invention, a refractive index may be measured at 25° C. with visible light having a wavelength of 589.3 nm using an Abbe refractometer after a graft polymer and a non-grafted polymer are unfolded to a thickness of 0.2 mm.

In the present invention, an average particle diameter may be measured by a dynamic light scattering method, specifically, by using a Nicomp 380 instrument (commercially available from Particle Sizing Systems). In the present invention, an average particle diameter may refer to an arithmetic average particle diameter in the particle size distribution as measured by a dynamic light scattering method, that is, an average particle diameter based on a scattering intensity distribution.

In the present invention, an average particle diameter may be measured using a transmission electron microscope (TEM).

In the present invention, the weights of a rubber polymer, a diene-based monomer unit, a (meth)acrylate-based monomer unit, an aromatic vinyl-based monomer unit, and a vinyl cyanide-based monomer unit, which are included in a thermoplastic resin composition, may be measured by infrared (IR) spectroscopy. In this case, as an IR spectrometer, a Nicolet™ iS20 FTIR spectrometer (commercially available from Thermo Scientific) may be used.

In the present invention, a polymerization conversion rate refers to the degree to which monomers are polymerized to form a polymer and may be calculated by the following equation.

Polymerization conversion rate (%)=((Total weight
of monomers added until polymerization is ter-
minated)−(Total weight of unreacted monomers
at time point when polymerization conversion rate is measured))/(Total weight of monomers
added until polymerization is terminated)×100

In the present invention, a diene-based monomer unit may be a unit derived from a diene-based monomer. The diene-based monomer may be one or more selected from the group consisting of 1,3-butadiene, isoprene, chloroprene, and piperylene, with 1,3-butadiene being preferred.

In the present invention, an aromatic vinyl-based monomer unit may be a unit derived from an aromatic vinyl-based monomer. The aromatic vinyl-based monomer may be one or more selected from the group consisting of styrene, α-methyl styrene, α-ethyl styrene, and p-methyl styrene, with styrene being preferred.

In the present invention, a (meth)acrylate-based monomer unit may be a unit derived from a (meth)acrylate-based monomer. The (meth)acrylate-based monomer may be a term encompassing both an acrylate-based monomer and a methacrylate-based monomer. The (meth)acrylate-based monomer may be a $C_1$ to $C_{10}$ alkyl (meth)acrylate-based monomer, and the $C_1$ to $C_{10}$ alkyl (meth)acrylate-based monomer may be one or more selected from the group consisting of methyl (meth)acrylate, ethyl (meth)acrylate, propyl (meth)acrylate, butyl (meth)acrylate, heptyl (meth) acrylate, hexyl (meth)acrylate, 2-ethylhexyl (meth)acrylate, and decyl (meth)acrylate, with methyl methacrylate being preferred.

In the present invention, a vinyl cyanide-based monomer unit may be a unit derived from a vinyl cyanide-based monomer. The vinyl cyanide-based monomer may be one or more selected from the group consisting of acrylonitrile, methacrylonitrile, phenyl acrylonitrile, and α-chloroacrylonitrile, with acrylonitrile being preferred.

In the present invention, a (meth)acrylic acid-based monomer unit may be one or more selected from the group consisting of acrylic acid and methacrylic acid.

In the present invention, an emulsifier may be one or more selected from the group consisting of sodium dicyclohexyl sulfosuccinate, sodium dodecyl sulfate, sodium dodecyl benzene sulfonate, sodium octadecyl sulfate, sodium oleyl sulfate, potassium dodecyl sulfate, potassium octadecyl sulfate, potassium oleate, sodium oleate, potassium rosinate, and sodium rosinate. Among those listed above, one or more selected from the group consisting of potassium oleate, sodium oleate, and potassium rosinate are preferred.

In the present invention, an initiator may be one or more selected from the group consisting of potassium persulfate, sodium persulfate, ammonium persulfate, cumene hydroperoxide, diisopropylbenzene hydroperoxide, azobisisobutyronitrile, t-butyl hydroperoxide, p-menthane hydroperoxide, benzoyl peroxide, and 1,1-bis(t-butylperoxy)cyclohexane. Among those listed above, one or more selected from the group consisting of potassium persulfate, cumene hydroperoxide, and 1,1-bis(t-butylperoxy)cyclohexane are preferred.

In the present invention, a molecular weight controlling agent may be one or more selected from the group consisting of an α-methyl styrene dimer, t-dodecyl mercaptan, n-dodecyl mercaptan, t-octyl mercaptan, n-octyl mercaptan, carbon tetrachloride, methylene chloride, methylene bromide, tetraethylthiuram disulfide, dipentamethylenethiuram disulfide, and diisopropyl xanthogen disulfide. Among those listed above, t-dodecyl mercaptan is preferred.

In the present invention, a redox-based catalyst may be one or more selected from the group consisting of sodium formaldehyde sulfoxylate, sodium ethylenediaminetetraacetate, ferrous sulfate, dextrose, tetrasodium pyrophosphate, anhydrous sodium pyrophosphate, and sodium sulfate. Among those listed above, one or more selected from the group consisting of ferrous sulfate, dextrose, and tetrasodium pyrophosphate are preferred.

In the present invention, an aqueous solvent may be ion-exchanged water or deionized water.

1. Thermoplastic Resin Composition

A thermoplastic resin composition according to one aspect of the present invention includes: a graft polymer including a rubber polymer having a gel content of 0 to 10 wt % and including an aromatic vinyl-based monomer unit and a diene-based monomer unit; and a shell including a (meth)acrylate-based monomer unit and an aromatic vinyl-based monomer unit, which are grafted to the rubber polymer; and a non-grafted polymer including 90 wt % or more of a (meth)acrylate-based monomer unit.

The refractive indices of the graft polymer and non-grafted polymer included in the thermoplastic resin composition according to the present invention may differ by 0.0350 or more, preferably, 0.0400 or more. When the above-described condition is satisfied, the thermoplastic resin composition can have opaqueness.

The thermoplastic resin composition according to the present invention may include 10.0 to 50.0 wt % of the graft polymer and 50.0 to 90.0 wt % of the non-grafted polymer, preferably 15.0 to 45.0 wt % of the graft polymer and 55.0 to 85.0 wt % of the non-grafted polymer, and more preferably 15.0 to 35.0 wt % of the graft polymer and 65.0 to 85.0 wt % of the non-grafted polymer. When the above-described conditions are satisfied, the thermoplastic resin composition can realize excellent impact resistance and processability.

The thermoplastic resin composition according to the present invention may include 5.0 to 25.0 wt % of the rubber polymer, preferably, 10.0 to 20.0 wt %. When the above-described condition is satisfied, the thermoplastic resin composition can realize excellent impact resistance.

The thermoplastic resin composition according to the present invention may include 60.0 to 90.0 wt % of the (meth)acrylate-based monomer unit, preferably, 65.0 to 85.0 wt %. When the above-described condition is satisfied, the thermoplastic resin composition can realize excellent impact resistance and scratch resistance.

In addition, the thermoplastic resin composition according to the present invention may include 3.0 to 20.0 wt % of the aromatic vinyl-based monomer unit preferably, 8.0 to 15.0 wt %. When the above-described condition is satisfied, the thermoplastic resin composition can realize excellent processability.

Additionally, the thermoplastic resin composition according to the present invention may include a vinyl cyanide-based monomer unit. In this case, the vinyl cyanide-based monomer unit may be included in an amount of 10.0 wt % or less, preferably, 5 wt % or less. When the above-described condition is satisfied, excellent chemical resistance can be realized while minimizing yellowing.

Hereinafter, the graft polymer and the non-grafted polymer, which are components of the present invention, will be described in detail.

1) Graft Polymer

The graft polymer includes a rubber polymer having a gel content of 0 to 10 wt % and including an aromatic vinyl-based monomer unit and a diene-based monomer unit; and a shell including a (meth)acrylate-based monomer unit and an aromatic vinyl-based monomer unit, which are grafted to the rubber polymer. Also, the shell may include a (meth) acrylate-based monomer unit and an aromatic vinyl-based monomer unit, which are not grafted to the rubber polymer.

In order to improve the chemical resistance of the graft polymer, the shell may further include a vinyl cyanide-based monomer unit which is grafted or not grafted to the rubber polymer.

The rubber polymer may have a gel content of 0 to 10 wt %, preferably 0 to 5 wt %, and more preferably 0 to 1 wt %. When the above-described range is satisfied, the thermoplastic resin composition can realize excellent matte characteristics and impact resistance. However, above the above-described range, the thermoplastic resin composition may not realize matte characteristics, and impact resistance may be substantially degraded.

Meanwhile, the gel content of the rubber polymer may be adjusted by a polymerization temperature and a final polymerization conversion rate, and a rubber polymer satisfying the above-described gel content may be prepared by initiating and performing polymerization of an aromatic vinyl-based monomer unit and a diene-based monomer unit at 0 to 20° C. and terminating the polymerization when a polymerization conversion rate reaches 40 to 60%. Preferably, a rubber polymer satisfying the above-described gel content may be prepared by initiating and performing polymerization of an aromatic vinyl-based monomer unit and a diene-based monomer unit at 5 to 15° C. and terminating the polymerization when a polymerization conversion rate reaches 45 to 55%.

When any one of the above-described polymerization temperature and polymerization termination point is not satisfied, it may be difficult to prepare a rubber polymer satisfying the above-described gel content.

The polymerization may be emulsion polymerization and may be performed in the presence of one or more selected from the group consisting of an emulsifier, an initiator, a molecular weight controlling agent, a redox-based catalyst, and an aqueous solvent.

The emulsifier may be used in an amount of 1.0 to 10.0 parts by weight, preferably, 3.0 to 7.0 parts by weight with respect to 100 parts by weight of the total monomers added in preparation of the rubber polymer. When the above-described condition is satisfied, polymerization stability and latex stability can be improved, and adjustment can be made so that the rubber polymer has a desired average particle diameter.

The initiator may be used in an amount of0.1 to 0.5 parts by weight, preferably, 0.1 to 0.3 parts by weight with respect to 100 parts by weight of the total monomers added in preparation of the rubber polymer. When the above-described condition is satisfied, emulsion polymerization can be stably initiated and performed.

The molecular weight controlling agent may be used in an amount of 0.1 to 1.7 parts by weight, preferably 0.3 to 1.5 parts by weight, and more preferably 0.5 to 1.3 parts by weight with respect to 100 parts by weight of the total monomers added in preparation of the rubber polymer. When the above-described condition is satisfied, the gel content of the rubber polymer can be finely adjusted. When the content of the molecular weight controlling agent increases, a gel content may decrease, and when the content of the molecular weight controlling agent decreases, a gel content may increase.

The redox-based catalyst may be used in an amount of0.010 to 0.100 parts by weight, preferably, 0.030 to 0.080 parts by weight with respect to 100 parts by weight of the total monomers added in preparation of the rubber polymer.

Meanwhile, in the case of a rubber polymer including only a diene-based monomer unit, to prevent or minimize a difference in refractive index between the impact modifying part and matrix part of a thermoplastic resin composition, an excessive amount of a (meth)acrylate-based monomer unit needs to be included in the matrix part. However, the (meth)acrylate-based monomer unit causes a degradation of chemical resistance of a thermoplastic resin composition and an increase in manufacturing costs due to a high unit cost of the (meth)acrylate-based monomer. Also, a rubber polymer may not be prepared using only an aromatic vinyl-based monomer.

However, since the rubber polymer includes not only the diene-based monomer unit but also the aromatic vinyl-based monomer unit, the refractive index of the rubber polymer can be increased, and accordingly, the inclusion of a small amount of a (meth)acrylate-based monomer unit in the matrix part is possible. Therefore, the thermoplastic resin composition according to the present invention can minimize a degradation of chemical resistance and an increase in manufacturing costs, which are caused by the (meth)acrylate-based monomer unit.

The rubber polymer may include the aromatic vinyl-based monomer unit and the diene-based monomer unit in a weight ratio of 10:90 to 35:65, preferably, 15:85 to 30:70. When the above-described condition is satisfied, impact resistance can be improved, and a refractive index can be increased, and thus the usage amount of a (meth)acrylate-based monomer unit can be reduced, and a degradation of chemical resistance and an increase in manufacturing costs, which are caused by the (meth)acrylate-based monomer unit, can be minimized.

The rubber polymer may have a higher refractive index than a rubber polymer consisting of only a diene-based monomer unit by including the diene-based monomer unit and the aromatic vinyl-based monomer unit in the above-described weight ratio. As a specific example, the rubber polymer may have a refractive index of 1.5230 to 1.5420, preferably, 1.5300 to 1.5400.

The rubber polymer may have an average particle diameter of 20 to 100 nm, preferably, 20 to 80 nm. When the above-described range is satisfied, excellent matte characteristics and impact resistance can be realized.

The graft polymer may include 30.0 to 65.0 wt % of the rubber polymer, preferably, 35.0 to 60.0 wt %. When the above-described range is satisfied, excellent impact resistance can be realized.

The graft polymer may include 10.0 to 55.0 wt % of the (meth)acrylate-based monomer unit, preferably, 15.0 to 50.0 wt %. When the above-described range is satisfied, excellent scratch resistance can be realized.

The graft polymer may include 5.0 to 40.0 wt % of the aromatic vinyl-based monomer unit, preferably, 10.0 to 35.0 wt %. When the above-described range is satisfied, excellent processability can be realized.

The graft polymer may further include a vinyl cyanide-based monomer unit, and the vinyl cyanide-based monomer unit may be included in an amount of 7.0 wt % or less to realize excellent chemical resistance and minimize yellowing. In this case, the content of the vinyl cyanide-based monomer unit may mean the content of vinyl cyanide-based monomer units which are grafted or not grafted to the rubber polymer.

The graft polymer may have a refractive index of 1.5230 to 1.5420, preferably, 1.5300 to 1.5400. When the above-described range is satisfied, the refractive index is the same as or similar to the refractive index of the above-described rubber polymer, and thus the transparency of the graft polymer can be improved.

2) Non-Grafted Polymer

The non-grafted polymer includes 90 wt % or more of a (meth)acrylate-based monomer unit. When the content of the (meth)acrylate-based monomer unit is less than the above-described range, the scratch resistance and matte characteristics of the thermoplastic resin composition may be degraded.

In order to improve scratch resistance, the non-grafted polymer may further include one or more comonomers selected from the group consisting of a (meth)acrylic acid-based monomer unit and an aromatic vinyl-based monomer unit. The comonomer may be included as a remainder so that the content of monomers in the non-grafted polymer is 100 wt %.

The non-grafted polymer may have a refractive index of 1.4800 to 1.5000, preferably, 1.4850 to 1.4950.

Hereinafter, the present invention will be described in detail with reference to embodiments so that those skilled in the art can easily carry out the present invention. However, the present invention may be embodied in several different forms, and therefore, is not limited to embodiments described herein.

Preparation Example 1

<Preparation of Rubber Polymer>

200 parts by weight of ion-exchanged water, 20 parts by weight of styrene, 80 parts by weight of 1,3-butadiene, 2.0 parts by weight of potassium oleate, 3.0 parts by weight of potassium rosinate, 0.1 parts by weight of cumene hydroperoxide, 1.0 part by weight of t-dodecyl mercaptan, 0.010 parts by weight of sodium pyrophosphate, 0.050 parts by weight of dextrose, and 0.001 parts by weight of ferrous sulfate were batch-added into a nitrogen-substituted polymerization reactor (autoclave) and polymerized at 10° C. When a polymerization conversion rate reached 50%, the polymerization was terminated to prepare a styrene/butadiene rubber polymer latex (gel content: 0 wt %, average particle diameter: 40 nm, refractive index: 1.5310).

<Preparation of Graft Polymer>

A liquid mixture including 200 parts by weight of ion-exchanged water, 1.0 part by weight of sodium oleate, 29.6 parts by weight of methyl methacrylate, 20.4 parts by weight of styrene, 0.6 parts by weight of t-dodecyl mercaptan, 0.050 parts by weight of ethylenediamine tetraacetic acid, 0.100 parts by weight of sodium formaldehyde sulfoxylate, 0.001 parts by weight of ferrous sulfate, and 0.2 parts by weight of cumene hydroperoxide was prepared.

50 parts by weight (based on a solid content) of the styrene/butadiene rubber polymer latex was input into a reactor. Then, polymerization was performed while continuously adding the liquid mixture into the reactor at 60° C. for 5 hours. After the continuous addition of the liquid mixture was completed, aging was performed at 60° C. for an hour, and the polymerization was terminated to prepare a graft polymer latex. The entire amount of the graft polymer latex was added to an aqueous solution containing 2 parts by weight of calcium chloride, coagulated, aged, washed, dehydrated, and dried to prepare graft polymer powder (refractive index: 1.5310).

Preparation Example 2

<Preparation of Rubber Polymer>

200 parts by weight of ion-exchanged water, 25 parts by weight of styrene, 75 parts by weight of 1,3-butadiene, 3.0 parts by weight of potassium oleate, 3.0 parts by weight of potassium rosinate, 0.1 parts by weight of cumene hydroperoxide, 0.8 parts by weight of t-dodecyl mercaptan, 0.010 parts by weight of sodium pyrophosphate, 0.050 parts by weight of dextrose, and 0.001 parts by weight of ferrous sulfate were batch-added into a nitrogen-substituted polymerization reactor (autoclave) and polymerized at 10° C. When a polymerization conversion rate reached 60%, the polymerization was terminated to prepare a styrene/butadiene rubber polymer latex (gel content: 1 wt %, average particle diameter: 40 nm, refractive index: 1.5350).

<Preparation of Graft Polymer>

A liquid mixture including 200 parts by weight of ion-exchanged water, 1.0 part by weight of sodium oleate, 25.7 parts by weight of methyl methacrylate, 21.8 parts by weight of styrene, 2.5 parts by weight of acrylonitrile, 0.4 parts by weight of t-dodecyl mercaptan, 0.050 parts by weight of ethylenediamine tetraacetic acid, 0.100 parts by weight of sodium formaldehyde sulfoxylate, 0.001 parts by weight of ferrous sulfate, and 0.2 parts by weight of cumene hydroperoxide was prepared.

50 parts by weight (based on a solid content) of the styrene/butadiene rubber polymer latex was input into a reactor. Then, polymerization was performed while continuously adding the liquid mixture into the reactor at 60° C. for 5 hours. After the continuous addition of the liquid mixture was completed, aging was performed at 60° C. for an hour, and the polymerization was terminated to prepare a graft polymer latex. The entire amount of the graft polymer latex was added to an aqueous solution containing 2 parts by weight of calcium chloride, coagulated, aged, washed, dehydrated, and dried to prepare graft polymer powder (refractive index: 1.5350).

Preparation Example 3

<Preparation of Rubber Polymer>

200 parts by weight of ion-exchanged water, 25 parts by weight of styrene, 75 parts by weight of 1,3-butadiene, 3.0 parts by weight of potassium oleate, 3.0 parts by weight of potassium rosinate, 0.1 parts by weight of cumene hydroperoxide, 1.0 part by weight of t-dodecyl mercaptan, 0.010 parts by weight of sodium pyrophosphate, 0.050 parts by weight of dextrose, and 0.001 parts by weight of ferrous sulfate were batch-added into a nitrogen-substituted polymerization reactor (autoclave) and polymerized at 15° C. When a polymerization conversion rate reached 60%, the polymerization was terminated to prepare a styrene/butadiene rubber polymer latex (gel content: 5 wt %, average particle diameter: 40 nm, refractive index: 1.5350).

<Preparation of Graft Polymer>

Graft polymer powder (refractive index: 1.5350) was prepared in the same manner as in Preparation Example 2, except that the above-described styrene/butadiene rubber polymer latex was used.

Preparation Example 4

<Preparation of Rubber Polymer>

200 parts by weight of ion-exchanged water, 25 parts by weight of styrene, 75 parts by weight of 1,3-butadiene, 2.0 parts by weight of potassium oleate, 3.0 parts by weight of potassium rosinate, 0.1 parts by weight of potassium persulfate, 0.8 parts by weight of t-dodecyl mercaptan, 0.010 parts by weight of sodium pyrophosphate, 0.050 parts by weight of dextrose, and 0.001 parts by weight of ferrous sulfate were batch-added into a nitrogen-substituted polymerization reactor (autoclave) and polymerized at 10° C. When a polymerization conversion rate reached 65%, the polymerization was terminated to prepare a styrene/butadiene rubber polymer latex (gel content: 15 wt %, average particle diameter: 40 nm, refractive index: 1.5350).

<Preparation of Graft Polymer>

Graft polymer powder (refractive index: 1.5350) was prepared in the same manner as in Preparation Example 2, except that the above-described styrene/butadiene rubber polymer latex was used.

Preparation Example 5

<Preparation of Rubber Polymer>

200 parts by weight of ion-exchanged water, 25 parts by weight of styrene, 75 parts by weight of 1,3-butadiene, 1.0 part by weight of potassium oleate, 1.0 part by weight of potassium rosinate, 0.2 parts by weight of potassium persulfate, 0.3 parts by weight of t-dodecyl mercaptan, 0.010 parts by weight of sodium pyrophosphate, 0.050 parts by weight of dextrose, and 0.001 parts by weight of ferrous sulfate were batch-added into a nitrogen-substituted polymerization reactor (autoclave) and polymerized at 70° C. When a polymerization conversion rate reached 93%, the polymerization was terminated to prepare a styrene/butadiene rubber polymer latex (gel content: 65 wt %, average particle diameter: 300 nm, refractive index: 1.5350).

<Preparation of Graft Polymer>

Graft polymer powder (refractive index: 1.5350) was prepared in the same manner as in Preparation Example 2, except that the above-described styrene/butadiene rubber polymer latex was used.

Preparation Example 6

<Preparation of Rubber Polymer>

200 parts by weight of ion-exchanged water, 25 parts by weight of styrene, 75 parts by weight of 1,3-butadiene, 2.0 parts by weight of potassium oleate, 1.0 part by weight of potassium rosinate, 0.3 parts by weight of potassium persulfate, 0.3 parts by weight of t-dodecyl mercaptan, 0.010 parts by weight of sodium pyrophosphate, 0.050 parts by weight of dextrose, and 0.001 parts by weight of ferrous sulfate were batch-added into a nitrogen-substituted polymerization reactor (autoclave) and polymerized at 70° C. When a polymerization conversion rate reached 99%, the polymerization was terminated to prepare a styrene/butadiene rubber polymer latex (gel content: 90 wt %, average particle diameter: 90 nm, refractive index: 1.5350).

<Preparation of Graft Polymer>

Graft polymer powder (refractive index: 1.5350) was prepared in the same manner as in Preparation Example 2, except that the above-described styrene/butadiene rubber polymer latex was used.

Preparation Example 7

A methyl methacrylate homopolymer (IH830 commercially available from LG MMA Corp., refractive index: 1.4900) was used.

Preparation Example 8

A liquid mixture including 86 parts by weight of methyl methacrylate, 14 parts by weight of styrene, 3 parts by weight of toluene, 0.01 parts by weight of 1,1-bis(t-butylperoxy)cyclohexane, and 0.4 parts by weight of t-dodecyl mercaptan was prepared.

Polymerization was performed for an average polymerization time of 3 hours while continuously adding the liquid mixture into a reactor. In this case, the temperature of the reactor was 148° C. The polymerization solution discharged from the reactor was heated in a preheating bath, and unreacted monomers were volatilized in a volatilization tank to prepare a polymer. Then, the polymer was transferred to a polymer transfer pump extruder while maintaining a temperature of 210° C., thereby preparing a non-grafted polymer pellet (refractive index: 1.5040).

Examples 1 to 4 and Comparative Examples 1 to 4

The graft polymers and non-grafted polymers of Preparation Examples were mixed in amounts described in Tables 1 and 2 below to prepare thermoplastic resin compositions.

Experimental Example 1

Physical properties of the rubber polymers of Preparation Examples were evaluated by methods described below, and results thereof are shown in Tables 1 and 2 below.

1) Gel content (wt %): The rubber polymer latex was coagulated with calcium chloride, washed, and dried in a 60° C. vacuum oven for 24 hours to obtain a rubber mass. The rubber mass was cut with scissors to prepare a 1 g rubber section, and the rubber section was input into 100 g of toluene and stored in a 23° C. dark room for 48 hours to separate a sol and a gel. The weight of the sol and gel was substituted into the following equation to calculate a gel content.

$$\text{Gel content (wt \%)} = \text{Weight of gel/Weight of rubber section} \times 100$$

2) Average particle diameter (nm): measured by a dynamic light scattering method using a Nicomp 380 instrument (commercially available from Particle Sizing Systems).

3) Refractive index: measured at 25° C. with visible light having a wavelength of 589.3 nm using an Abbe refractometer after the rubber section prepared in the measurement of a gel content was unfolded to a thickness of 0.2 mm.

Experimental Example 2

The composition of the thermoplastic resin compositions of Examples and Comparative Examples was measured by a method described below, and results thereof are shown in Tables 1 and 2 below.

1) Contents (wt %) of styrene/butadiene rubber polymer, methyl methacrylate monomer unit, styrene monomer unit, and acrylonitrile monomer unit: the contents of the rubber polymer and monomer units in the thermoplastic resin composition were calculated by infrared (IR) spectroscopy using a Nicolet™ iS20 FTIR spectrometer (commercially available from Thermo Scientific).

Experimental Example 3

100 parts by weight of each thermoplastic resin composition of Examples and Comparative Examples and 0.2 parts by weight of an antioxidant were mixed and extruded to prepare a pellet. The pellet was injection-molded to prepare a specimen, physical properties of the specimen were evaluated by methods described below, and results thereof are shown in Tables 1 and 2 below.

1) Glossiness (45°): The glossiness of the specimen (thickness: 3 mm) was measured at 45° using a gloss meter (VG7000 commercially available from Nippon Denshoku Industries Co., Ltd.). It was determined that, when a glossiness value was 30 or less, matte characteristics were realized, and as a glossiness value is lower, better matte characteristics were exhibited.

2) Glossiness (60°): The glossiness of the specimen (thickness: 3 mm) was measured at 60° using a gloss meter (VG7000 commercially available from Nippon Denshoku Industries Co., Ltd.). It was determined that, when a glossiness value was 30 or less, matte characteristics were realized, and as a glossiness value is lower, better matte characteristics were exhibited.

3) Impact strength (kgf·cm/cm): The notched IZOD impact strength of the specimen (¼ inch) was measured at 23° C. in accordance with ASTM D256.

4) Pencil hardness: measured in accordance with ASTM D3365.

TABLE 1

| Classification | | | Example 1 | Example 2 | Example 3 | Example 4 |
|---|---|---|---|---|---|---|
| Graft polymer | | | | | | |
| Type | | | Preparation Example 1 | Preparation Example 2 | Preparation Example 2 | Preparation Example 3 |
| SBR | Monomer | S | 20 | 25 | 25 | 25 |
| | (wt %) | BD | 80 | 75 | 75 | 75 |
| | Gel content (wt %) | | 0 | 1 | 1 | 5 |
| | Average particle diameter (nm) | | 40 | 40 | 40 | 40 |
| | Refractive index | | 1.5310 | 1.5350 | 1.5350 | 1.5350 |
| Others | SBR | | 50.0 | 50.0 | 50.0 | 50.0 |
| (parts by | MMA | | 29.6 | 25.7 | 25.7 | 25.7 |
| weight) | S | | 20.4 | 21.8 | 21.8 | 21.8 |
| | AN | | 0 | 2.5 | 2.5 | 2.5 |
| | Refractive index | | 1.5310 | 1.5350 | 1.5350 | 1.5350 |
| Non-grafted polymer | | | | | | |
| Type | | | Preparation Example 7 [[5]]7 | Preparation Example 7 [[5]]7 | Preparation Example 7 [[5]]7 | Preparation Example 7 [[5]]7 |
| Refractive index | | | 1.4900 | 1.4900 | 1.4900 | 1.4900 |
| Thermoplastic resin composition | | | | | | |
| Graft polymer (parts by weight) | | | 30 | 20 | 30 | 30 |
| Non-grafted polymer (parts by weight) | | | 70 | 80 | 70 | 70 |
| SBR (wt %) | | | 15 | 10 | 15 | 15 |
| MMA monomer unit (wt %) | | | 78.88 | 85.14 | 77.71 | 77.71 |

TABLE 1-continued

| Classification | Example 1 | Example 2 | Example 3 | Example 4 |
|---|---|---|---|---|
| S monomer unit (wt %) | 6.12 | 4.36 | 6.54 | 6.54 |
| AN monomer unit (wt %) | 0.0 | 0.5 | 0.75 | 0.75 |
| Difference in refractive index between graft polymer and non-grafted polymer | 0.0410 | 0.0450 | 0.0450 | 0.0450 |
| Physical property evaluation results | | | | |
| Glossiness (45°) | 14 | 13 | 15 | 17 |
| Glossiness (60°) | 15 | 14 | 16 | 18 |
| Impact strength (kgf · cm/cm) | 9 | 8 | 11 | 12 |
| Pencil hardness | 2H | 3H | 2H | 2H |

SBR: Styrene/butadiene rubber polymer
S: Styrene
BD: 1,3-Butadiene
MMA: Methyl methacrylate
AN: Acrylonitrile

TABLE 2

| Classification | | Comparative Example 1 | Comparative Example 2 | Comparative Example 3 | Comparative Example 4 |
|---|---|---|---|---|---|
| Graft polymer | | | | | |
| Type | | Preparation Example 4 | Preparation Example 5 | Preparation Example 6 | Preparation Example 3 |
| SBR | Monomer S | 25 | 25 | 25 | 25 |
| | (wt %) BD | 75 | 75 | 75 | 75 |
| | Gel content (wt %) | 15 | 65 | 90 | 5 |
| | Average particle diameter (nm) | 40 | 300 | 90 | 40 |
| | Refractive index | 1.5350 | 1.5350 | 1.5350 | 1.5310 |
| Others | SBR | 50.0 | 50.0 | 50.0 | 50.0 |
| (parts by | MMA | 25.7 | 25.7 | 25.7 | 25.7 |
| weight) | S | 21.8 | 21.8 | 21.8 | 21.8 |
| | AN | 2.5 | 2.5 | 2.5 | 2.5 |
| | Refractive index | 1.5350 | 1.5350 | 1.5350 | 1.5350 |
| Non-grafted polymer | | | | | |
| Type | | Preparation Example 7 | Preparation Example 7 | Preparation Example 7 | Preparation Example 8 |
| Monomer | MMA | 100 | 100 | 100 | 86 |
| (parts by | S | 0 | 0 | 0 | 14 |
| weight) | Refractive index | 1.4900 | 1.4900 | 1.4900 | 1.5040 |
| Thermoplastic resin composition | | | | | |
| Graft polymer (parts by weight) | | 30 | 30 | 30 | 35 |
| Non-grafted polymer (parts by weight) | | 70 | 70 | 70 | 65 |
| SBR (wt %) | | 15 | 15 | 15 | 17.5 |
| MMA monomer unit (wt %) | | 77.74 | 77.71 | 77.71 | 60.8 |
| S monomer unit (wt %) | | 6.54 | 6.54 | 6.54 | 21.7 |
| AN monomer unit (wt %) | | 0.75 | 0.75 | 0.75 | 0.75 |
| Difference in refractive index between graft polymer and non-grafted polymer | | 0.0450 | 0.0450 | 0.0450 | 0.0310 |
| Physical property evaluation results | | | | | |
| Glossiness (45°) | | 49 | 119 | 125 | 18 |
| Glossiness (60°) | | 51 | 125 | 131 | 19 |
| Impact strength (kgf · cm/cm) | | 11 | 11 | 4 | 11 |
| Pencil hardness | | H | H | 2H | HB |

SBR: Styrene/butadiene rubber polymer
S: Styrene
BD: 1,3-Butadiene
MMA: Methyl methacrylate
AN: Acrylonitrile Referring to Tables 1 and 2, Examples 1 to 4 including graft polymers including rubber polymers having a gel content of 0 to 5 wt %/and an average particle diameter of 40 nm realized excellent impact resistance and scratch resistance while realizing matte characteristics. However, Comparative Example 1 including a graft polymer including a rubber polymer having a gel content of 15 wt % and an average particle diameter of 40 nm did not realize matte characteristics. Also, Comparative Example 2 including a graft polymer including a rubber polymer having a gel content of 65 wt % and an average particle diameter of 300 nm did not realize matte characteristics, and scratch resistance was degraded. Also, although the rubber polymer of Comparative Example 2 had a much larger average particle diameter, an equivalent level of impact resistance was exhibited as compared to Examples 1 to 4.

In addition, Comparative Example 3 including a graft polymer including a rubber polymer having a gel content of 90 wt % and an average particle diameter of 90 nm did not realize matte characteristics. Also, although the rubber polymer of Comparative Example 3 had a much larger average particle diameter, impact resistance was degraded as compared to Examples 1 to 4.

Additionally, Comparative Example 4 including a non-grafted polymer including a methyl methacrylate monomer unit in an amount of less than 90 wt % exhibited a pencil hardness of HB, and thus scratch resistance was degraded as compared to Examples 1 to 4.

The invention claimed is:

1. A thermoplastic resin composition comprising:
a graft polymer including a rubber polymer having a gel content of 0 to 10 wt % and including an aromatic vinyl-based monomer unit and a diene-based monomer unit; and a shell including a (meth)acrylate-based monomer unit and an aromatic vinyl-based monomer unit, which are grafted to the rubber polymer; and
a non-grafted polymer including 90 wt % or more of a (meth)acrylate-based monomer unit,
wherein the gel content is obtained from a method that comprises:
coagulating the rubber polymer with a diluted acid or metal salt to obtain a rubber mass,
cutting the rubber mass to prepare a 1 g rubber section,
placing the rubber section into 100 g of toluene to separate a sol and a gel, and
calculating the gel content from Equation (I):

$$\text{Gel content (wt \%)} = \text{Weight of gel/Weight of rubber section} \times 100 \qquad \text{(I)}.$$

2. The thermoplastic resin composition of claim 1, wherein the rubber polymer has the gel content of 0 to 5 wt %.

3. The thermoplastic resin composition of claim 1, wherein the rubber polymer includes the aromatic vinyl-based monomer unit and the diene-based monomer unit in a weight ratio of 10:90 to 35:65.

4. The thermoplastic resin composition of claim 1, wherein the rubber polymer has an average particle diameter of 20 to 100 nm.

5. The thermoplastic resin composition of claim 1, wherein the graft polymer includes, based on 100 wt % of a total weight of the graft polymer:
30.0 to 65.0 wt % of the rubber polymer;
10.0 to 55.0 wt % of the (meth)acrylate-based monomer unit; and
5.0 to 40.0 wt % of the aromatic vinyl-based monomer unit.

6. The thermoplastic resin composition of claim 1, wherein the non-grafted polymer further includes one or more of a (meth)acrylic acid-based monomer unit and an aromatic vinyl-based monomer unit.

7. The thermoplastic resin composition of claim 1, comprising, based on 100 wt % of a total weight of the thermoplastic resin composition:
10.0 to 50.0 wt % of the graft polymer; and
50.0 to 90.0 wt % of the non-grafted polymer.

8. The thermoplastic resin composition of claim 1, wherein the shell of the graft polymer includes a vinyl cyanide-based monomer unit grafted to the rubber polymer.

9. The thermoplastic resin composition of claim 1, comprising, based on 100 wt % of a total weight of the thermoplastic resin composition:
5.0 to 25.0 wt % of the rubber polymer;
60.0 to 90.0 wt % of the (meth)acrylate-based monomer unit; and
3.0 to 20.0 wt % of the aromatic vinyl-based monomer unit.

* * * * *